United States Patent [19]
Wattenhofer et al.

[11] Patent Number: 5,982,157
[45] Date of Patent: Nov. 9, 1999

[54] CHOPPER-AMPLIFIER FOR THE VOLTAGE OF A PHOTOVOLTAIC POWER SOURCE, IN PARTICULAR FOR A TIMEPIECE

[75] Inventors: Jean-Pierre Wattenhofer; Pierre-André Farine, both of Neuchâtel, Switzerland

[73] Assignee: Asulab S.A., Bienne, Switzerland

[21] Appl. No.: 09/023,124

[22] Filed: Feb. 13, 1998

[30] Foreign Application Priority Data

Feb. 17, 1997 [EP] European Pat. Off. ............. 97102519

[51] Int. Cl.⁶ ................................ G05F 1/10; G05F 1/40
[52] U.S. Cl. ........................................... 323/222; 323/285
[58] Field of Search .......................... 323/222, 282–285, 323/906; 363/37

[56] References Cited

U.S. PATENT DOCUMENTS

| | | | |
|---|---|---|---|
| 3,970,919 | 7/1976 | Butcher | 323/19 |
| 4,291,266 | 9/1981 | Portmann | 320/2 |
| 4,580,090 | 4/1986 | Bailey et al. | 323/303 |
| 4,730,287 | 3/1988 | Yoshino et al. | 368/205 |
| 5,747,967 | 5/1998 | Muljadi et al. | 320/39 |
| 5,801,519 | 9/1998 | Midya et al. | 323/222 |
| 5,822,278 | 10/1998 | Ohshima et al. | 368/204 |

FOREIGN PATENT DOCUMENTS 2 900 622  7/1980  Germany.

OTHER PUBLICATIONS

Elektronik, vol. 39, No. 9, Apr. 27, 1990, p. 150/151 XP000116206 Rittenbruch F–A: "Solar–Akkulader Mit Nur Einer Solarzelle".

*Primary Examiner*—Edward H. Tso
*Assistant Examiner*—Rajnikant D. Patel
*Attorney, Agent, or Firm*—Griffin, Butler, Whisenhunt & Szipl, LLP

[57] ABSTRACT

In this booster, the voltage across the terminals of the photovoltaic power source (1) is regulated as a function of a reference voltage ($V_{ref}$) which is chosen to be substantially equal to the voltage corresponding to the maximum value of the voltage-power curve of this source. The reference voltage generated in the reference generator (9) is compared to the voltage ($V_{sc}$) of the source (1), the result is sampled and influences the duty cycle of a control signal ($F_c$) applied to the switching transistor (7). The latter is responsible for chopping the current flowing from the source to the load (accumulator 6) through an inductor coil (4) and a diode (5).

7 Claims, 2 Drawing Sheets

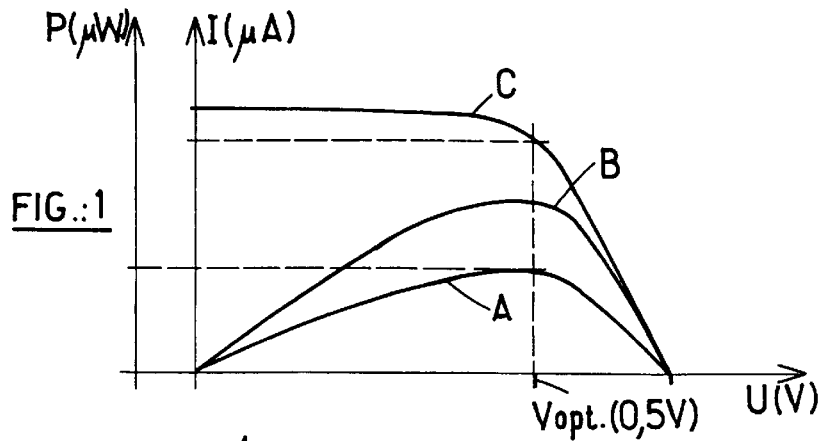
FIG.:1
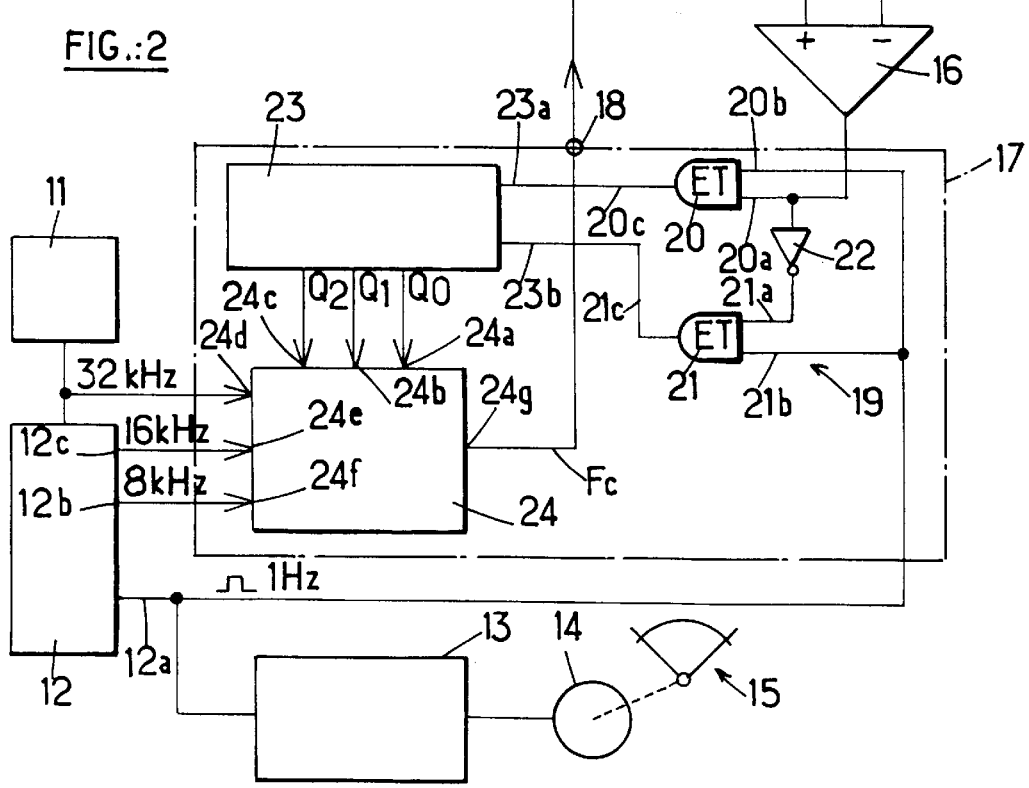
FIG.:2

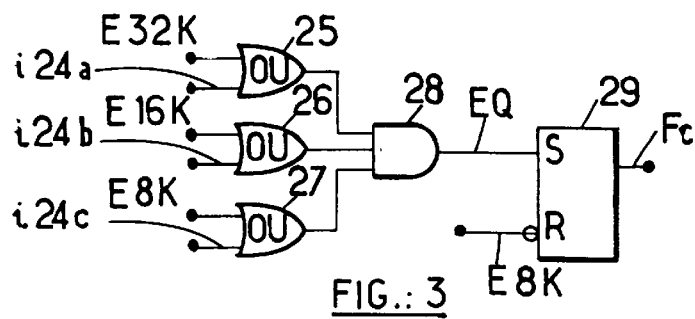
FIG.: 3
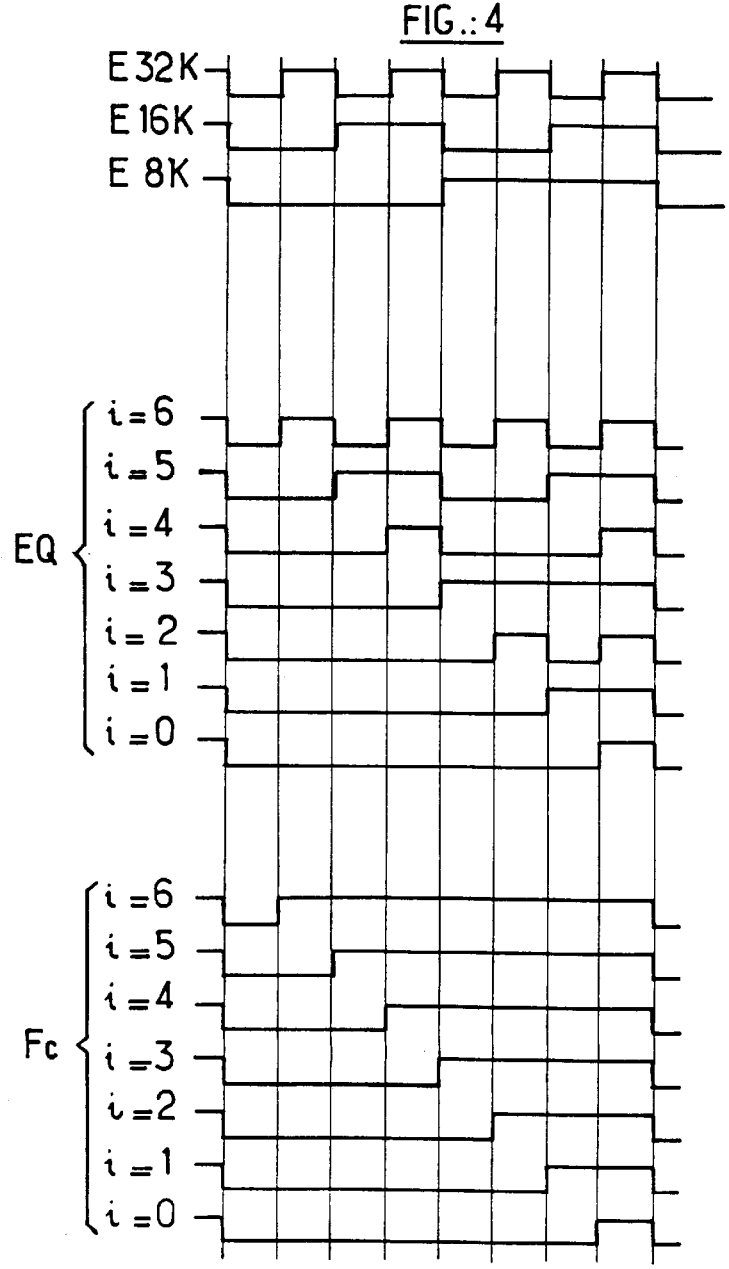
FIG.: 4

CHOPPER-AMPLIFIER FOR THE VOLTAGE OF A PHOTOVOLTAIC POWER SOURCE, IN PARTICULAR FOR A TIMEPIECE

The present invention relates to an electric voltage booster for a power source operating by photovoltaic conversion.

More precisely, the invention concerns a voltage booster operating on the principle of periodic chopping of the current which a photovoltaic power source supplies to its load.

This type of voltage booster coupled to a photovoltaic power source or cell is particularly suitable for assuring the electrical energy supply of low energy consuming devices such as timepieces, in particular a watch or an alarm clock, a pocket calculator, a miniature radio set, an infrared or radio remote control, a cordless telephone, a GPS receiver, etc. These low power consuming apparatus have an autonomous electrical power supply and include an electric accumulator as the cell load which is kept charged from the photovoltaic power source. The list of possible applications of the invention which has just been given is evidently in no way limiting.

The photovoltaic power sources or cells currently used to assure the power supply of these low power consuming devices, typically supply a voltage of approximately 0.3 to 0.6 V per element, whether they are of the semi-conductor or photochemical type. Moreover, the electronic circuits require a supply voltage which cannot be less than 1 V, so that several of these cells are usually connected in series to assure the supply thereof.

For aesthetic reasons, and reasons of space requirement, price etc., (criteria which are particularly crucial in the horological technology), design solutions are currently sought wherein a single photovoltaic cell is sufficient to assure the power supply of the apparatus.

It is thus seen that there is a theoretical incompatibility between the low voltage supplied by a single photovoltaic cell and the electric voltage requirements of the current integrated circuits necessary for operating the apparatus of the above mentioned type.

A solution allowing this incompatibility to be overcome, has already been proposed in German Patent Application No. DOS 29 00 622 which discloses a voltage chopper-amplifier capable of converting the voltage supplied by the cell into a voltage which is applied to a load, in this case an accumulator, which it is intended to charge.

For this purpose, the cell is connected to its load via an inductor coil and a blocking diode in series, the node between these two components being periodically grounded via a switching transistor so that the inductor coil can alternatively store and release magnetic energy to supply power to its load.

In order to increase the conversion output, the aforecited Patent Document proposes to regulate the chopping rate, or in other words the successive conduction and blocking durations of the switching transistor or the duty cycle of the control signal of such transistor. This regulation is achieved by a monostable flip-flop whose time constant is varied as a function of the quantity of light which hits the cell. This circuit may also be considered for the solar cell as a load varying as a function of the surrounding illumination.

A similar circuit is known from an article in the publication Elektronik, 2087, 39 (1990), 27 April, No. 9, Munich, DE. In this case, the transistor's switching point may be adjusted by a manually controlled potentiometer, which, according to the recommendations of the author of the article, must be adjusted to a nominal value for maximum illumination (full sunlight).

However, tests made by the Applicant of the present Patent Application on photovoltaic cells of this type show that, for a given illumination hitting the cell, there exists an optimum output power value which is obtained for a relatively well determined value of the voltage across the terminals of the cell. FIG. 1 of the annexed drawings shows a diagram in which the voltage U in volts across the cell has been brought in abscises, as a function on the one hand of the output power P in $\mu$W (power curves A and B) and as a function, on the other hand, of the delivered current I in $\mu$A (current curve C). The two power curves have been determined with an illumination of 1000 lux (curve A and C) and an illumination of 2000 lux (curve B) respectively.

The diagram in question describes, by way of example, the behaviour of a $TiO_2$ solar cell, a case wherein the value of the voltage $V_{opt}$ for which the output power is maximum is around 0.5 V, this value being slightly offset towards the right of the diagram as the illumination increases within a relatively limited range. It has been noted that other types of solar cells have a similar diagram, bearing in mind that the most favourable nominal voltage value for a given output power, may vary from one type of cell to another.

An object of the invention is to provide a voltage booster of the type indicated hereinbefore, wherein advantage is taken of these findings so that the booster may always supply, with very good approximation, the maximum power to its load virtually whatever the illumination to which the solar cell is exposed.

The invention thus concerns a booster for a low voltage supplied by a photovoltaic cell according to claim 1.

Other features and advantages of the invention will appear during the description which follows, given solely by way of example and made with reference to the annexed drawings, in which:

FIG. 1 already described is a diagram illustrating the behaviour of a photovoltaic cell able to be used with a voltage booster according to the invention;

FIG. 2 is a simplified diagram of a voltage booster according to the invention;

FIG. 3 shows an embodiment example of the duty cycle variation block used in the voltage booster of FIG. 2; and FIG. 4 shows several waveforms appearing in the voltage booster according to the invention.

FIG. 2 shows a preferred embodiment of the voltage booster according to the invention used here, by way of example, in a timepiece.

It includes a photovoltaic cell or solar cell 1 formed for example by a single element and supplying a nominal value voltage $V_{sc}$ of 0.5 V, for example. It may be any semi-conductor or photochemical type photovoltaic cell, for example a $TiO_2$ cell. It supplies its voltage $V_{sc}$ across a ground terminal 2 and a positive terminal 3. An inductor coil 4 and a diode 5, for example a Schottky diode, are connected in series between terminal 3 and the positive pole of an accumulator 6 whose negative pole is connected to ground terminal 2.

Accumulator 6 may be of any type currently available on the market, such as chemical accumulators, preferably lithium ion accumulators, and electrochemical capacities, in particular those which are usually designated by the term "supercapacitors" or "supercaps".

It is to be noted, however, that the invention may be used for other applications in which the load is formed by one or more other components requiring power supply by cell 1.

The source-drain path of a switching transistor 7 is connected between node 7 formed by inductor coil 4 and diode 5, on the one hand, and ground 2 on the other hand.

A reference voltage block 9 is connected between the positive pole (terminal 10) of accumulator 6 and ground 2. This reference voltage block supplies a voltage $V_{ref}$ which is adjusted to optimum voltage value $V_{opt}$ (FIG. 1) to which the output voltage of the cell at terminal 3 is to be adjusted. In the example described, wherein cell 1 is preferably a $TiO_2$ type electrochemical cell, this voltage is adjusted to 0.5 V, as illustrated by the diagram of FIG. 1.

As already indicated hereinbefore, the invention is described in application to a timepiece whose usual main components are shown schematically in FIG. 2. Thus, this timepiece includes a quartz oscillator 11 supplying a pulse signal of a frequency of approximately 32 kHz. (The exact value is typically 32 768 Hz). This oscillator is connected to a frequency divider 12 whose last output 12a supplies pulses at a frequency of 1 Hz. These pulses are applied to a control circuit 13 of a stepping motor 14 driving hands 15.

Voltage $V_{sc}$ and voltage $V_{ref}$ are compared in a comparator 16 whose inputs are respectively connected to terminal 3 and to the output of reference voltage block 9. The output of this comparator 16 is connected to a circuit 17 which generates the control signal of transistor 7, its output 18 being connected to the gate of transistor 7 for this purpose.

Control signal generating circuit 17 of transistor 7 includes a sampling block 19 formed of two AND gates 20 and 21 and an inverter 22. More precisely, the output of comparator 16 is connected to one 20a of the inputs of AND gate 20, and via inverter 22, to one 21a of the inputs of AND gate 21. The other inputs 20b and 21b of these gates 20 and 21 are both connected to output 12a of frequency divider 12 whose signal they receive at 1 Hz. In this way, the output of comparator 16 is sampled at a rhythm of one comparison signal per second, this value evidently being selected by way of example only.

Outputs 20c and 21c of AND gates 20 and 21 are respectively connected to the up 23a and down 23b counting inputs of an up/down counter 23. This latter component includes three outputs $Q_0$, $Q_1$ and $Q_2$ indicating its content by a binary number which can go from 0 to 7. However, in the example, only the first six values are used, i.e. position "7" is blocked.

Generator circuit 17 also includes a combinatorial logic 24 having first inputs 24a, 24b and 24c respectively connected to outputs $Q_0$, $Q_1$ and $Q_2$ of up/down counter 23, and second inputs 24d, 24e and 24f respectively connected to the output of oscillator 11 and to two additional outputs 12b and 12c of frequency divider 12. These outputs supply respectively pulses at approximately 8 kHz and 16 kHz. Combinatorial logic 24 also has an output 24g at which a control signal $F_c$ for the gate of transistor 7 appears.

The diagram of combinatorial logic 24 appears in FIG. 3. It is seen that, in the embodiment example shown, it includes three OR gates 25, 26 and 27, whose outputs are applied to the respective inputs of an AND gate 28. The output of this latter is connected to the set input S of a bistable flip flop 29 of the "RNSFF" (reset-not-set flip-flop) type. This flip flop has a reset input R to which the signal from output 12b of frequency divider 12 is applied, which has a frequency here of 8 kHz.

One of the inputs of each of OR gates 25, 26 and 27 is respectively connected to one of inputs 24a, 24b, 24c of combinatorial logic 24 and thus receives signals called respectively $i_{24a}$, $i_{24b}$ and $i_{24c}$ together representing a value able to vary between 0 and 6 and called i. This value i is materialised in up/down counter 23.

The other inputs of OR gates 25, 26 and 27 are respectively connected to inputs 24d, 24e and 24f of this latter and thus receive respective signals having a frequency of 32, 16 and 8 kHz which are designated E32k, E16k and E8k.

Consequently, by designating the AND gate output 28 EQ, the following logic equation may be made:

$$EQ = (E8k + i_{24c}) * (E16k + i_{24b}) * (E32k + i_{24a})$$

Flip flop 29 transforms output EQ of AND gate 28 to generate control signal $F_c$ for the gate of transistor 7, it being understood that output $F_c$ passes to "1" on the rising edge of the signal applied to output S of the flip flop and to "0" on the trailing edge of the signal applied to input R.

The various waveforms involved in the operation of combinatorial logic 24 are shown in FIG. 4.

The result is that the duty cycle of control signal $F_c$ of transistor 7, and consequently of the current flowing towards load 6 from the solar cell, varies in the following manner. Every second, up/down counter 23 is incremented by one unit if $V_{sc} > V_{ref}$, and decremented if $V_{sc} < V_{ref}$. This variation in the content of the counter leads to the selection of a duty cycle given as a function of the combination of logic signals in which combinatorial logic 24 intervenes.

The following table may thus be drawn up for the duty cycle:

TABLE

| Counter Content 23 | All Interval (us) | Nothing Interval (us) | All Interval % | Nothing Interval % |
|---|---|---|---|---|
| i = 6 | 106.2 | 15.3 | 87.5 | 12.5 |
| i = 5 | 91.6 | 30.5 | 75.0 | 25.0 |
| i = 4 | 76.3 | 45.8 | 62.5 | 37.5 |
| i = 3 | 61.0 | 61.0 | 50 | 50 |
| i = 2 | 45.8 | 76.3 | 37.5 | 62.5 |
| i = 1 | 30.5 | 91.6 | 25.0 | 75.0 |
| i = 0 | 15.3 | 106.8 | 12.5 | 87.5 |

The system will stabilise itself when voltage Vsc is close to voltage Vref, i.e. every second it will try to establish the most favourable duty cycle for the voltage conversion to be made in the best possible output conditions.

It is to be noted that the invention provides a voltage booster whose operation is entirely digital. Its use is thus particularly advantageous in digital circuits such as those found in timepieces driven by a quartz.

The resolution of the duty cycle may be increased by adding additional stages to the up/down counter, and by adapting the combinatorial logic.

It will also be noted that the different blocks 9, 11, 12, 13, 14, 16 and 17 (see FIG. 2) are supplied by accumulator 6.

It is to be noted that implementation of the various functions described hereinbefore may be achieved via other digital circuits, in particular as regards the combinatorial logic, other frequency values and other values of reference voltage $V_{ref}$, this latter having to be best selected for each type of solar cell used.

What is claimed is:

1. A voltage booster for a low voltage supplied by a photovoltaic cell arranged to be applied to a load, said voltage booster including an inductor coil connected in series with a blocking diode between said cell and said load, the node between said inductor coil and said diode being connected to the common node between said cell and said load via a switchable semi-conductor component; said voltage booster also including regulating means for applying a pulse control signal to said switchable semi-conductor component whose duty cycle is adjustable so that the voltage across the terminals of said cell is substantially equal to a predetermined voltage substantially corresponding to the maximum value of a voltage-power characteristic curve of said cell, wherein said regulating means include a comparator for comparing the voltage across the terminals of said cell to a reference voltage equal to said predetermined voltage and further include a circuit connected to said comparator for generating said control signal capable of varying the value of said duty cycle according to whether the voltage across the terminals of said cell is less than or greater than said reference voltage.

2. A voltage booster according to claim 1, wherein said predetermined voltage is approximately 0.5 volts.

3. A voltage booster according to claim 1, wherein said predetermined voltage is equal to the voltage of two solar cells, approximately 1 volt.

4. A voltage booster according to claim 1, wherein it includes a reference voltage source supplying said reference voltage equal to said predetermined voltage.

5. A voltage booster according to claim 1, wherein said regulating means also include means for sampling the output signal of said comparator and thus for effecting periodic adjustment of said duty cycle.

6. A voltage booster according to claim 6, wherein said regulating means include an up/down counter which is connected to said sampling means and whose content varies as a function of the result of the comparison effected by said comparator, means for generating a plurality of pulse signals of different frequencies and a combinatorial logic connected to the output of said up/down counter and to said generator means and capable of establishing said duty cycle as a function of the content of said up/down counter.

7. A voltage booster according to claim 6, wherein said regulating means include an up/down counter which is connected to said sampling means and whose content varies as a function of the result of the comparison effected by said comparator, means for generating a plurality of pulse signals of different frequencies and a combinatorial logic connected to the output of said up/down counter and to said generator means and capable of establishing said duty cycle as a function of the content of said up/down counter.

* * * * *